No. 857,083. PATENTED JUNE 18, 1907.
E. O. LINTON.
LIQUID MEASURING APPARATUS.
APPLICATION FILED OCT. 17, 1905.
3 SHEETS—SHEET 1.
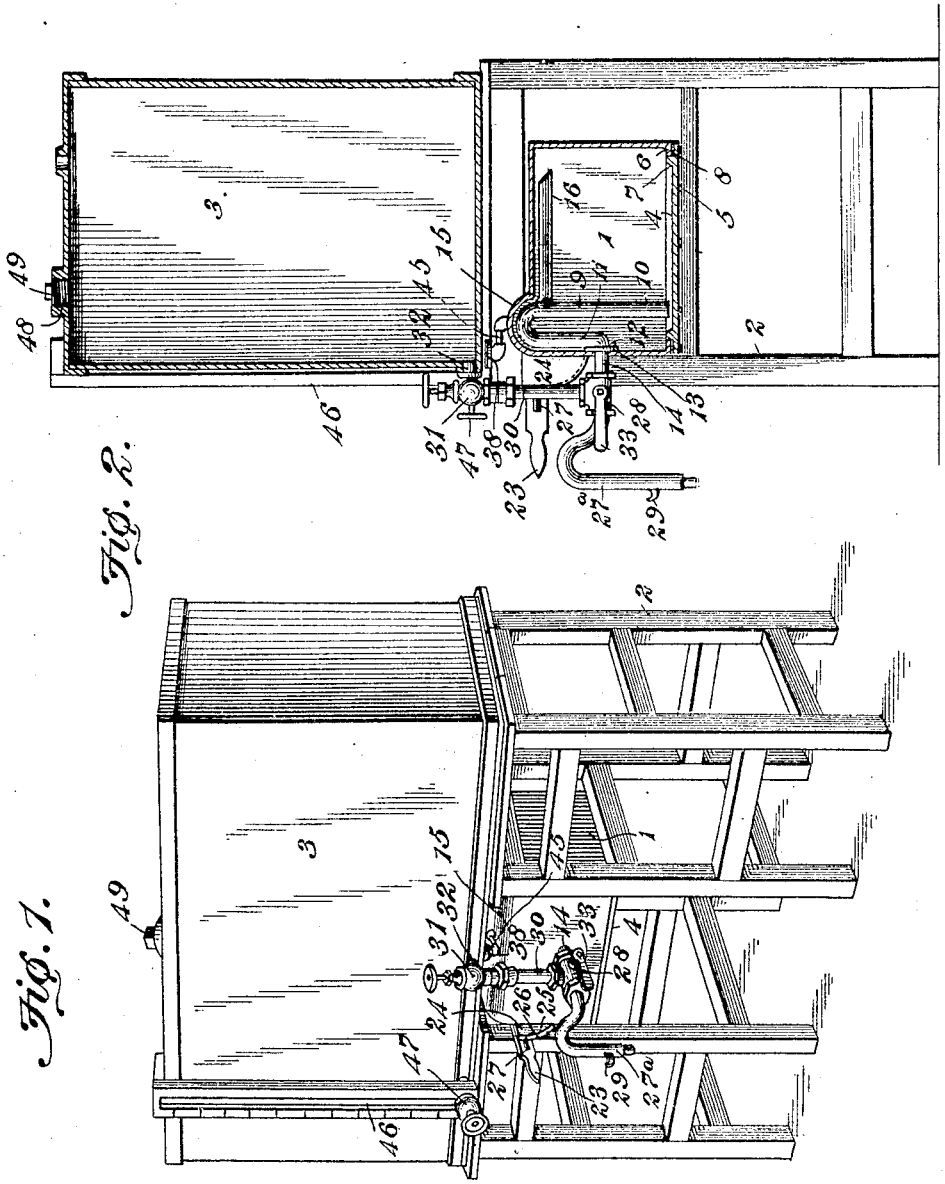
Witnesses
J. Howard Bishop.
H. J. Riley
Ernest O. Linton, Inventor.
By C. G. Siggers
Attorney

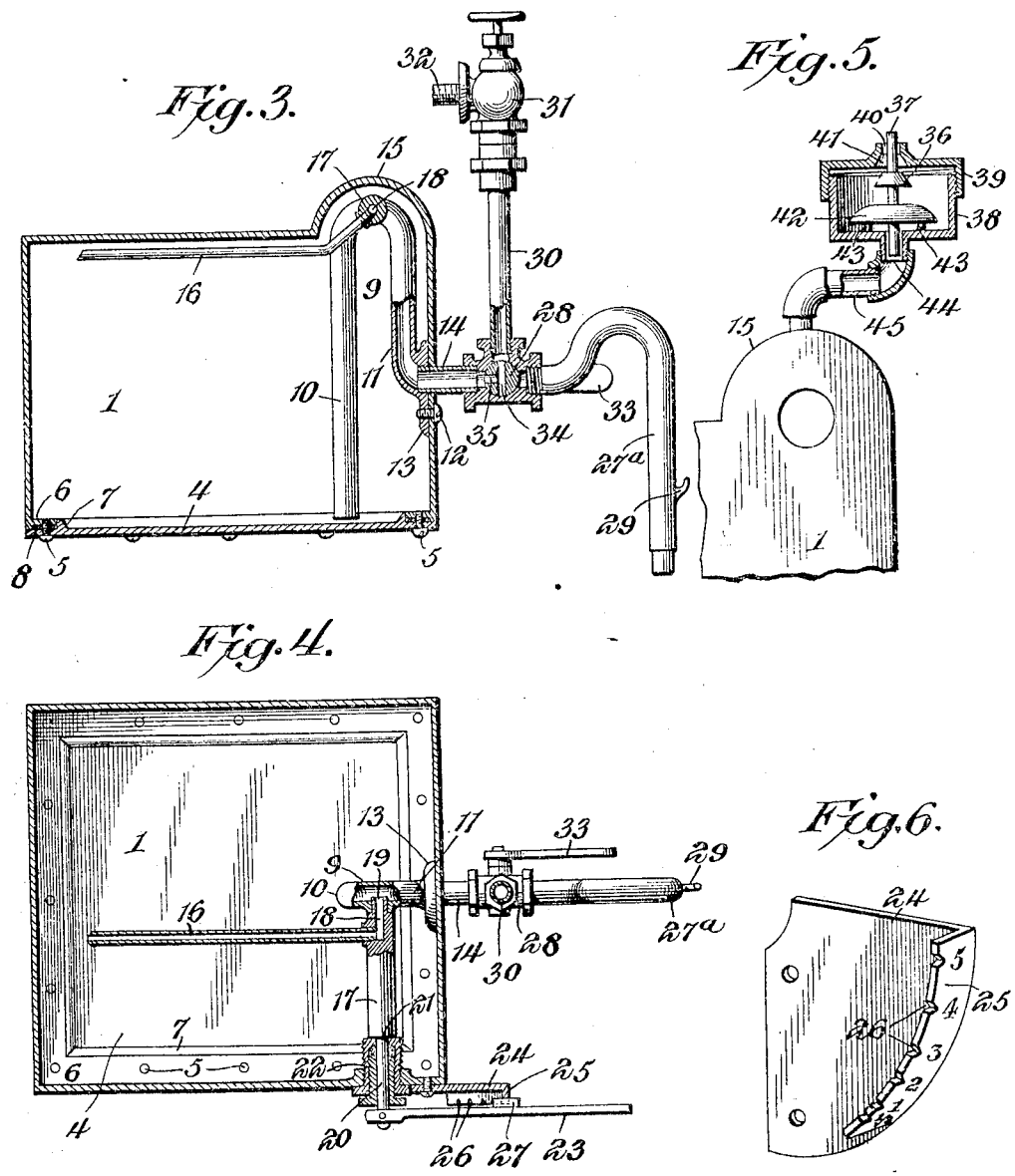

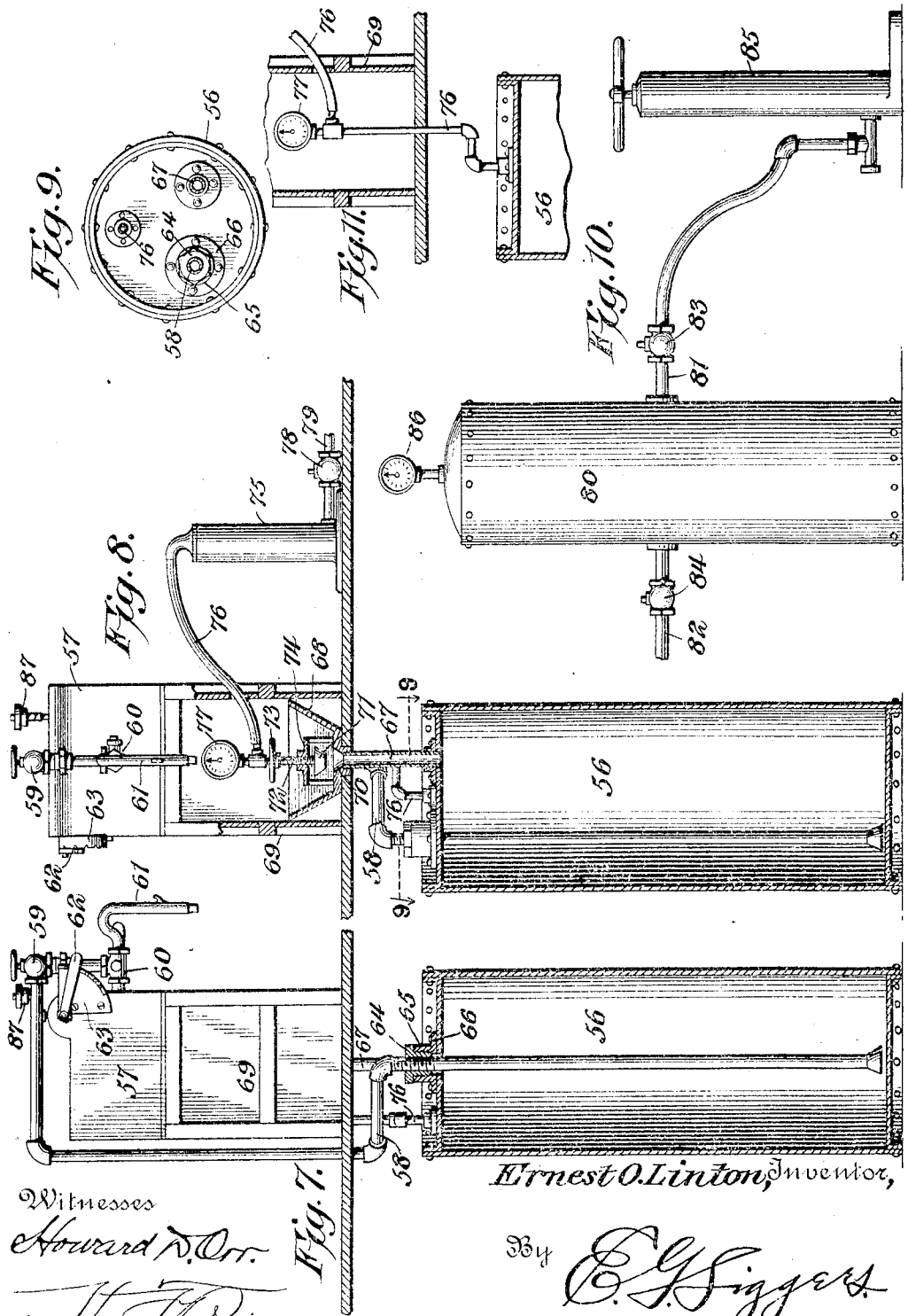

UNITED STATES PATENT OFFICE.

ERNEST O. LINTON, OF SHEBOYGAN, WISCONSIN, ASSIGNOR OF ONE-THIRD TO LOUIS GUTSCH AND ONE-THIRD TO D. T. PHALEN, BOTH OF SHEBOYGAN, WISCONSIN.

LIQUID-MEASURING APPARATUS.

No. 857,083.  Specification of Letters Patent.  Patented June 18, 1907.

Application filed October 17, 1905. Serial No. 283,132.

*To all whom it may concern:*

Be it known that I, ERNEST O. LINTON, a citizen of the United States, residing at Sheboygan, in the county of Sheboygan and State of Wisconsin, have invented a new and useful Liquid-Measuring Apparatus, of which the following is a specification.

The invention relates to improvements in liquid measuring apparatus.

The object of the present invention is to improve the construction of liquid measuring appliances, more especially that shown and described in Patent No. 781,535, granted to me the 31st day of January, 1905, and to provide a simple and comparatively inexpensive construction, capable of accurately measuring oil and other liquids, and adapted to be employed in connection with a supply tank located either on the same floor as the measuring receptacle or on the floor below, so that the measuring receptacle can be conveniently and compactly arranged in a store while the supply of oil or other liquid is stored in a basement or cellar.

Another object of the invention is to provide a measuring apparatus in which the flow of a liquid will be automatically cut off when the desired quantity has been delivered to a receptacle, and in which the measuring receptacle will be automatically refilled as soon as the valve or cock is operated to close the discharge pipe.

With these and other objects in view, the invention consists in the construction and novel combination and arrangement of parts, hereinafter fully described, illustrated in the accompanying drawings, and pointed out in the claims, hereto appended; it being understood that various changes in the form, proportion, size, and minor details of construction, within the scope of the claims, may be resorted to without departing from the spirit or sacrificing any of the advantages of the invention.

In the drawings:—Figure 1 is a perspective view of a measuring apparatus, constructed in accordance with this invention, and provided with a superimposed tank for containing a supply of the liquid to be measured. Fig. 2 is a vertical sectional view of the same, the liquid measuring mechanism being shown in elevation. Fig. 3 is an enlarged detail vertical sectional view of the measuring receptacle, illustrating the construction of the liquid measuring mechanism. Fig. 4 is a horizontal sectional view of the same. Fig. 5 is an enlarged detail sectional view illustrating the construction of the float-actuated vent valve of the measuring receptacle. Fig. 6 is a detail perspective view of the graduated quadrant shaped gage plate. Fig. 7 is a side elevation partly in section of the measuring apparatus having a tank located in the basement or floor beneath that on which the measuring receptacle is placed. Fig. 8 is a front elevation partly in section of the apparatus, as shown in Fig. 7. Fig. 9 is a horizontal sectional view taken substantially on the line 9—9 of Fig. 8. Fig. 10 is an elevation of a compressed air storage tank, and a hand pump for supplying the same with compressed air. Fig. 11 is a detail vertical sectional view, illustrating the arrangement of the compressed air supply pipe shown in Figs. 7 to 9 inclusive.

Like numerals of reference designate corresponding parts in all the figures of the drawings.

1 designates a measuring receptacle mounted in a frame 2, which also supports a tank 3, designed to contain a large quantity of the liquid to be measured, and connected with the measuring receptacle by the means hereinafter described. The measuring receptacle, which is substantially rectangular in cross section, may be of any desired configuration, and of any preferred size for measuring the desired quantity, a five gallon measuring receptacle being preferable when the apparatus is employed for handling oil. The measuring receptacle is provided with a removable bottom 4, which is secured by screws 5 to a horizontal flange 6, that extends inwardly from the walls of the measuring receptacle. The bottom, which is adapted to be detached to afford access to the interior of the measuring receptacle, is preferably provided at its upper face with a projecting rib 7, which fits against the edge of the inwardly extending horizontal flange 6, and a suitable packing 8 is interposed between the flange 6 and the marginal portions of the bottom to provide a liquid-tight joint. The supporting frame, which is preferably composed of open-work, as clearly illustrated in Figs. 1 and 2 of the drawings, is provided with front and rear uprights and horizontal connecting bars, but any other suitable construction may be employed, as will be readily understood.

Within the measuring receptacle at the front portion thereof is located a siphon 9, having an inner or rear long leg 10, and a short front leg 11, which is connected with the rear or inner leg at the top by a curved portion, as clearly shown in Figs. 2 and 3 of the drawings. The long leg extends from a point within a short distance of the bottom of the receptacle to the top thereof, and the short leg extends downward at the inner face of the front wall of the receptacle, and is secured to the same adjacent to the center thereof by means of a screw 12, or other suitable fastening device, which pierces the front wall of the receptacle and engages a flange 13, having a threaded opening to receive the screw. One or more fastening devices may be employed for this purpose, as will be readily understood, and the front wall is provided with an aperture, through which extends a nipple 14, having its ends exteriorly threaded and engaging interior screw threads of the lower end of the short leg of the siphon. The top of the measuring vessel is arched at 15 to clear the curved connecting top portion of the siphon, but the top of the measuring receptacle may be arranged entirely above the siphon if desired.

Communicating with the top of the siphon is a pivotally mounted oscillatory air tube 16, which is adapted to have its outer end arranged at different elevations within the measuring receptacle. When the liquid within the measuring receptacle falls sufficiently to uncover its outer end, it is adapted to admit air to the top of the siphon to break up the siphonal action, and thereby stop the discharge of the liquid from the measuring receptacle. The liquid from the measuring receptacle is discharged therefrom by the action of the siphon, and when the operation of the latter is interrupted, it will be apparent that the flow of the liquid through the same will immediately cease. The adjustable air pipe 16 is mounted on and carried by a horizontal shaft 17, which is provided at its inner end with a short longitudinal passage 18, extending from the inner end of the tube 16 to the interior of the siphon tube. The inner end 19 of the horizontal shaft 17 is reduced to form a pivot, and to provide a shoulder, the pivot being arranged within a suitable bearing opening of the top of the siphon tube, and the shoulder fitting against a corresponding shoulder formed on the exterior of the siphon tube, as clearly illustrated in Fig. 4 of the drawings. The outer portion of the horizontal shaft 17 is reduced to form a stem 20, and to provide a shoulder 21. The stem is arranged within a stuffing box 22, which is adjustable for engaging the shoulder 21, and which forms a liquid-tight joint to prevent any leakage from the measuring receptacle. An exteriorly arranged operating lever 23 is secured to the outer end of the reduced portion or stem of the shaft 17, and is adapted to be oscillated over a quadrant-shaped gage 24 to adjust the air tube or pipe 16. The gage 24, consists of a plate, which is secured by screws or other suitable fastening devices to one of the side walls of the measuring receptacle, and which is provided with an outwardly extending curved flange 25, having suitable graduations and provided with notches 26, adapted to be engaged by a tapered indicating lug 27 of the operating lever 23. The operating lever 23 has sufficient resiliency to enable the lug to be readily engaged with any one of the notches 26 of the gage and by oscillating the lever 23, the inner end of the air tube 16 may be arranged at the desired elevation.

A delivery pipe $27^a$ is connected with the short leg of the siphon by a three-way cock 28, and the said delivery pipe, which forms a continuation of the short leg of the siphon, extends downward to a point below the long leg 10, and is provided with a projection or hook 29, adapted to receive the bail of an oil can or other receptacle for supporting the same in position to receive the liquid as it flows from the delivery pipe $27^a$. The three-way cock is also connected with the superimposed tank 3 by means of a pipe or tube 30, in which is placed a valve 31 for cutting off the supply of oil or other liquid from the tank to the measuring receptacle when desired. The valve 31 is provided with a threaded nipple 32, which is screwed into a suitable threaded opening of the tank, but it may be connected with the latter in any other desired manner, as will be readily understood. The three way cock is provided with an exteriorly arranged operating lever or handle 33, and it has a diametrically arranged passage 34, and a short radially arranged passage 35, extending from the passage 34, at right angles thereto.

When the operating handle or lever 33 is in a horizontal position as illustrated in Figs. 3 and 4 of the drawings, the diametrically arranged passage is in a vertical position, and the short radially arranged passage extends from the inner side thereof, whereby a communication is established between the supply pipe 30 and the interior of the measuring receptacle, through the nipple and the siphon tube. This will permit the measuring receptacle to fill, and when it is desired to measure any quantity within the capacity of the measuring receptacle, the adjustable air tube 16 is arranged at the desired elevation in the manner heretofore explained, and the operating handle or lever 33 is then swung upward from the horizontal position shown in Fig. 3 to a vertical position. This cuts out the supply pipe 30, and establishes a communication between the interiorly-arranged siphon tube and the exterior delivery tube, and permits the desired quantity of oil or other liquid to flow from the measuring receptacle. As soon as the liquid within the measuring receptacle reaches the level of the air tube 16, air will enter the same, and interrupt the action of the siphon and thereby stop the flow of the liquid. After the desired quantity of liquid has been discharged into an oil can or other receptacle, the handle or lever is swung downward to a horizontal position to cut out the delivery pipe, and to place the supply pipe in communication with the measuring receptacle, which will again fill.

In order to enable the contents of the measuring receptacle to flow freely therefrom, a float actuated vent valve 36 is provided. The vent valve, which is mounted on a stem 37, operates within a cylindrical or cup-shaped casing 38, which is provided with a threaded cap or cover 39, and which is connected at the bottom with the raised or arched portion 15 of the top of the measuring receptacle. The cover or cap 39 is provided with an air inlet opening 40, and it has a valve seat 41 surrounding the same, and arranged to be engaged by the valve 36, when the measuring receptacle fills and the liquid rises into the casing 38 and raises the float 42. As soon as the liquid recedes in the measuring receptacle, the float will drop and permit the air to enter the receptacle, thereby insuring a free discharge of the liquid therefrom. The valve stem is guided in the openings of the top and bottom of the casing 38, and the float may be provided with suitable stops 43, for limiting its downward movement to prevent the bottom aperture from being covered when the float drops. Any other suitable means, however, may be provided for limiting the downward movement of the float. The bottom of the casing 38 is provided with a depending threaded portion or nipple 44, which is connected with the measuring receptacle by a tube or pipe 45, composed of two short lengths of tubing and two elbow joints, as shown, but any other form of connecting tube or pipe may be employed, and the valve may be arranged at any other desired point, as will be readily understood.

Should it be desired to obtain access to the interior of the measuring receptacle for any purpose, the supply of liquid may be cut off by the valve 31, and the bottom 4 of the measuring receptacle may then be detached.

The superimposed tank 3 is provided with a glass gage tube 46, having graduations for enabling the quantity of liquid within the tank to be ascertained and provided at the front end with a suitable valve 47 to cut out the gage tube should the glass become broken. The superimposed tank is provided at the top with a suitable filling opening 48, having a projecting interiorly threaded flange adapted to receive a screw plug 49 for closing the opening.

In Figs. 7 to 9 inclusive of the drawings is illustrated an oil measuring apparatus, having an oil tank 56 arranged in a cellar or basement or floor below that on which the measuring receptacle 57 is arranged. The tank 56 is connected with the measuring receptacle by a supply pipe 58, having a valve 59, which is connected with a three-way cock 60 by a short pipe or tube. The three-way cock is constructed similar to that heretofore described, and connects a delivery pipe 61 with an interiorly arranged siphon tube, constructed like that heretofore described. The measuring receptacle 57 is provided with liquid measuring mechanism similar to that shown in Figs. 3 and 4 of the drawings, and having an operating lever 62 and a gage plate 63. The supply pipe 58 extends through the top of the tank 56 to within a short distance of the bottom thereof, and a suitable liquid tight joint is effected by means of a metal gland 64, which engages an interiorly threaded flange 65 of a plate 66. The plate 66 is suitably secured to the top of the tank 56, but any other suitable means may be provided for effecting a liquid tight joint. The liquid is supplied to the tank 56 through a short pipe or tube 67, which is connected to and communicates with a funnel 68, located within the frame 69 upon which the measuring receptacle 57 is mounted. The funnel is provided at the bottom with a valve seat 70, which is engaged by a valve 71, mounted on a threaded stem 72, and the latter is provided with a hand wheel 73, and engages a threaded opening of a support 74. When the tank is filled, the valve is closed, and prevent any leakage of the liquid or the pressure within the air tank.

The liquid may be forced from the tank into the measuring receptacle by means of a hydraulic air pump 75, which is connected with the tank by a suitable air pipe 76, having a pressure gage 77. The pressure is controlled by a suitable valve 78, arranged in a water service pipe 79. The hydraulic air pump 75, which may be of any desired construction is operated in the usual manner by water pressure, but a compressed air storage tank 80 may be employed if desired. The storage tank 80 is provided with an inlet pipe and a discharge pipe 81 and 82 respectively having valves 83 and 84. The inlet pipe is connected with a suitable hand pump 85, and the tank is provided with a pressure gage 86 for indicating the pressure within the tank. After the pressure has been raised the desired extent, the valve 83 is turned to cut out the air pump. The valve 84 may then be adjusted to regulate the pressure within the tank 56. The measuring receptacle 57 is provided with a float actuated vent valve 87, and the operation of the liquid measuring mechanism is automatic when the tank is arranged in a cellar or basement as well as when it is mounted above the measuring receptacle. The three way-cock establishes a communication between the measuring receptacle and the tank, and the liquid is forced out through the filling tube into the measuring receptacle, by the compressed air. The float actuated vent valve will permit the liquid to flow freely into the measuring receptacle until the tank is filled, and it will close as soon as the liquid rises within the casing, and thereby prevent any escape of the liquid through the vent. When the supply pipe is cut out, and a communication is established between the delivery pipe and the measuring receptacle, the liquid will flow therefrom until the siphonal action is interrupted by air passing through the adjustable air tube.

Having thus fully described my invention, what I claim as new, and desire to secure by Letters Patent, is:—

1. In an apparatus of the class described, the combination of a measuring receptacle, liquid measuring mechanism, a supply pipe, a valve casing connected with the top of the measuring receptacle and provided at its top with a valve seat, a valve arranged to engage the seat and provided with a stem having its ends guided in the top and bottom of the casing, a float located below the valve and connected with the stem at an intermediate point, and a stop extending downward from the float and arranged to limit the downward movement of the same.

2. In an apparatus of the class described, the combination of a measuring receptacle, an interiorly arranged siphon composed of a long leg extending from the top to the bottom of the receptacle, and a short leg, a delivery pipe, a valve connecting the delivery pipe with the short leg, and an adjustable air tube connected with the top of the siphon.

3. In an apparatus of the class described, the combination of a measuring receptacle, an interiorly arranged siphon, a delivery pipe, a supply pipe, a valve connecting the delivery pipe and the supply pipe with the siphon, an adjustable air tube communicating with the top of the siphon, a shaft carrying the air tube and having an exteriorly arranged lever, and a gage plate having a projecting flange arranged to be engaged by the lever.

In testimony, that I claim the foregoing as my own, I have hereto affixed my signature in the presence of two witnesses.

ERNEST O. LINTON.

Witnesses:
  SIMON GILLEN,
  MATILDA LORENZ.